United States Patent [19]

Fruehauf et al.

[11] Patent Number: 4,721,592
[45] Date of Patent: Jan. 26, 1988

[54] FILM EMBOSSING PROCESS

[75] Inventors: Vernon P. Fruehauf, Salt Springs, Fla.; Albert H. Hoefling, Hockessin, Del.; William S. Schlegel, Williamsville, N.Y.

[73] Assignee: E. I. Du Pont de Nemours and Company, Wilmington, Del.

[21] Appl. No.: 2,979

[22] Filed: Jan. 23, 1987

Related U.S. Application Data

[63] Continuation-in-part of Ser. No. 844,960, Mar. 27, 1986, abandoned.

[51] Int. Cl.⁴ .................. B29C 59/04; B29C 63/02
[52] U.S. Cl. .................... 264/171; 156/209; 264/284

[58] Field of Search ............... 156/209; 264/1.6, 127, 264/167, 171, 248, 284

[56] References Cited

U.S. PATENT DOCUMENTS 2,877,151  3/1959  Doherty et al. ............... 156/209
2,953,818  9/1960  Barton .
3,139,470  6/1964  Prengle et al. .

Primary Examiner—James Lowe

[57] ABSTRACT

Two or more sheets of polyvinyl fluoride film fuse together without the use of adhesive or embossing resin when passed through a hot roll embossing machine. The pressures, temperatures and feed rate are critical and depend on film thickness and the depth and type of pattern used.

2 Claims, 4 Drawing Figures

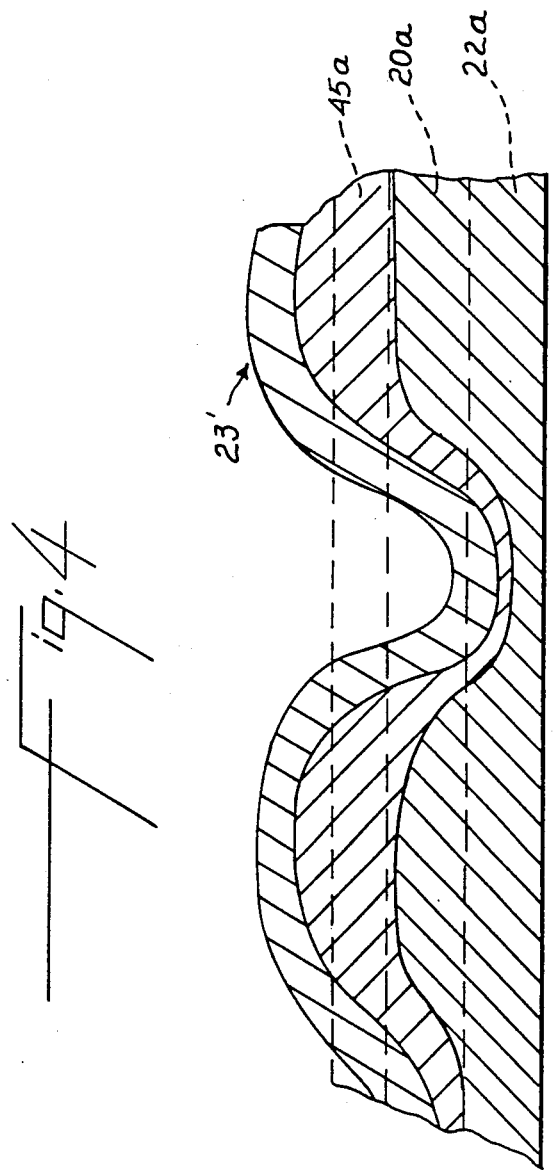

FILM EMBOSSING PROCESS

This is a continuation-in-part of application Ser. No. 844,960, filed Mar. 27, 1986 now abandoned.

BACKGROUND OF THE INVENTION

This invention relates to organic, thermoplastic film and more particularly to a process for embossing layers of such film without the use of adhesive.

The preparation of orientable polyvinyl fluorides is described in U.S. Pat. Nos. 2,419,008; 2,419,010; 2,510,783 and 2,599,300. Polymers prepared according to these procedures have attractive properties, and in film form possess an unusual combination of excellent resistance to outdoor weathering exposures, a high degree of physical toughness, chemical inertness, transparency and retention of properties at both low and elevated temperatures. These properties are manifested to an especially high degree in film derived from polymers of relatively high molecular weight.

Conventionally, when embossing two or more layers of such film, an adhesive or embossing resin is sandwiched between two sheets of the film to fuse them. It would be highly desirable from an economic viewpoint to fuse the sheets together while embossing them without the need for an adhesive.

SUMMARY OF THE INVENTION

To accomplish this a process has been developed for embossing and fusing two or more layers of polyvinyl fluoride film without adhesive. The process involves the steps of passing two or more separate sheets of such film having a thickness of between 0.001 and 0.004 inch between the nip of a heated embossing roll and a backup roll at a speed of from about 0.75 to 1.5 yds per minute. The temperature of the embossing roll is maintained in the range of from about 360°–390° F. while the temperature of the backup roll can be no higher than 170° F. The pressure between the embossing roll and backup roll is in the range of from about 400 to about 430 pounds per linear inch of film width. After embossing and fusing, the film is cooled then wound in a package on a driven mandrel.

BRIEF DESCRIPTION OF THE DRAWINGS

FIG. 4 is a schematic representation of three layers of fused embossed film prepared according to the invention.

DETAILED DESCRIPTION OF THE PREFERRED EMBODIMENT

Figure 1:
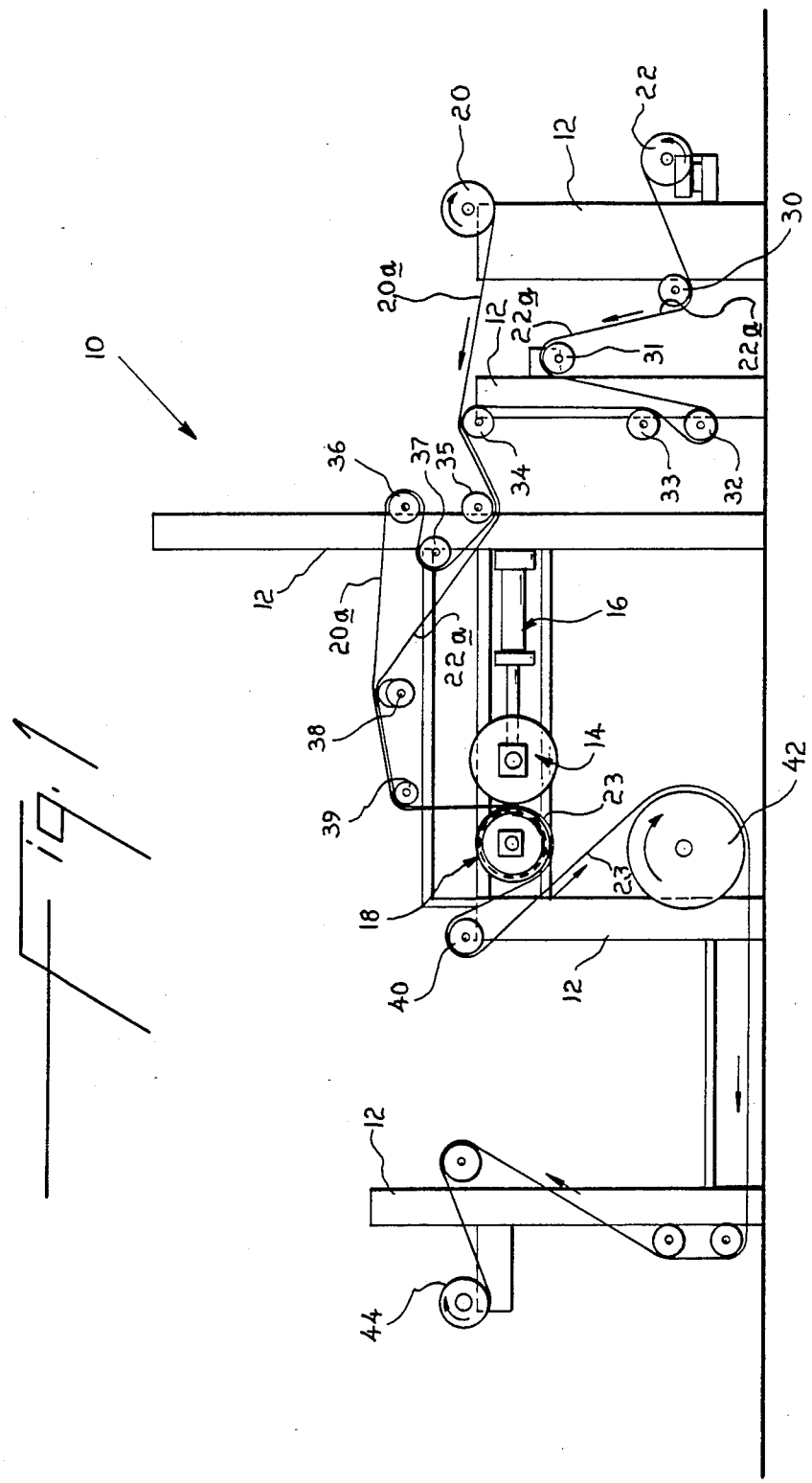
FIG. 1 is a schematic side elevation drawing of an embossing machine which may be used in the process of this invention.

The embossing machine 10 chosen for purposes of illustration is of the type that includes a series of rolls both driven and idler that are mounted to a main frame 12. More particularly, a driven embossing roll 14 is internally hot oil heated and has hydraulic cylinders 16 mounted between the frame 12 and the ends of roll 14 to exert lateral pressure. Resisting the pressure of the embossing roll 14 is a rotatable backup roll 18 that is fixed in one position to the frame 12. The roll 18 has a rubber surface and is water cooled. Rolls of polyvinyl fluoride film 20, 22 are rotatably mounted to one end of frame 12 and the two separate layers 20a and 22a are fed to the nip between rolls 14, 18 over a series of rolls designated 30 through 39. The rolls 30–39 control the tension and remove wrinkles from film 20a, 22a. After passing through rolls 16, 18, the combined film 23 passes over water cooled rolls 40, 42 where it is cooled before being wound on driven roll 44.

Figure 2:
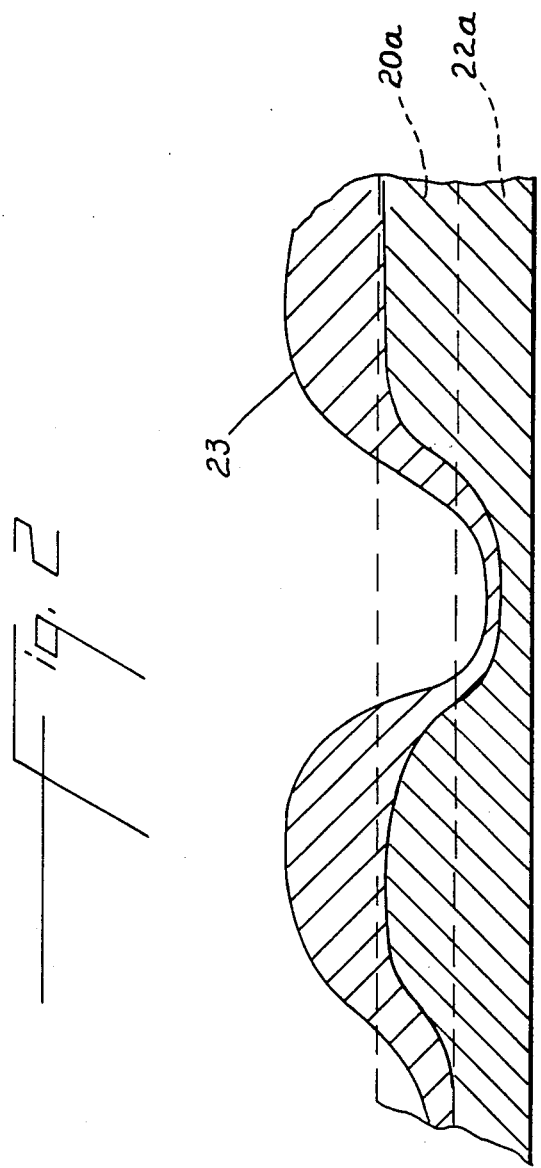
FIG. 2 is a schematic representation of the fused embossed film of this invention.

FIG. 2 shows film thickness of the combined film 23 after embossing and fusing of separate films 20a, 22a. In operation two sheets of film 20a, 22a are passed between the hot embossing roll 14 and the cool backup roll under controlled pressure, temperature and speed. At this point, the pattern is pressed in, and the two sheets are fused together. Any variation in any one variable, and the pattern is lost and the films do not fuse together. A typical run speed for a pair of 0.002 inch thick films is from 1 to 1½ yds/minute; the temperature of the embossing roll surface is between 360° and 390° F.; the temperature of the surface of the backup roll can be no higher than 170° F.; and the pressure between the rolls is between 400 and 430 lbs/linear inch of film width. The pressure and feed rate are dependent on the film thickness, and on the depth and type of pattern used. The wind-up mandrel 44 and two unwind mandrel 20, 22 torque are kept at the minimum necessary to prevent wrinkles.

In a series of runs at these conditions, the 0.004 inch thick (combined pair of 2 mil thick films) original film thickness is deformed to 7 mil by embossing, from the bottom of the film (which is smooth) to the top of pattern peaks as shown in FIG. 2. This embossed film pattern will survive deep vacuum forming on to shaped panels. The two layers of film are very difficult to separate without tearing.

While illustrated with 2 mil thick film, additional combinations utilizing 1, 3 and 4 mil film thickness combinations can be used.

Figure 3:
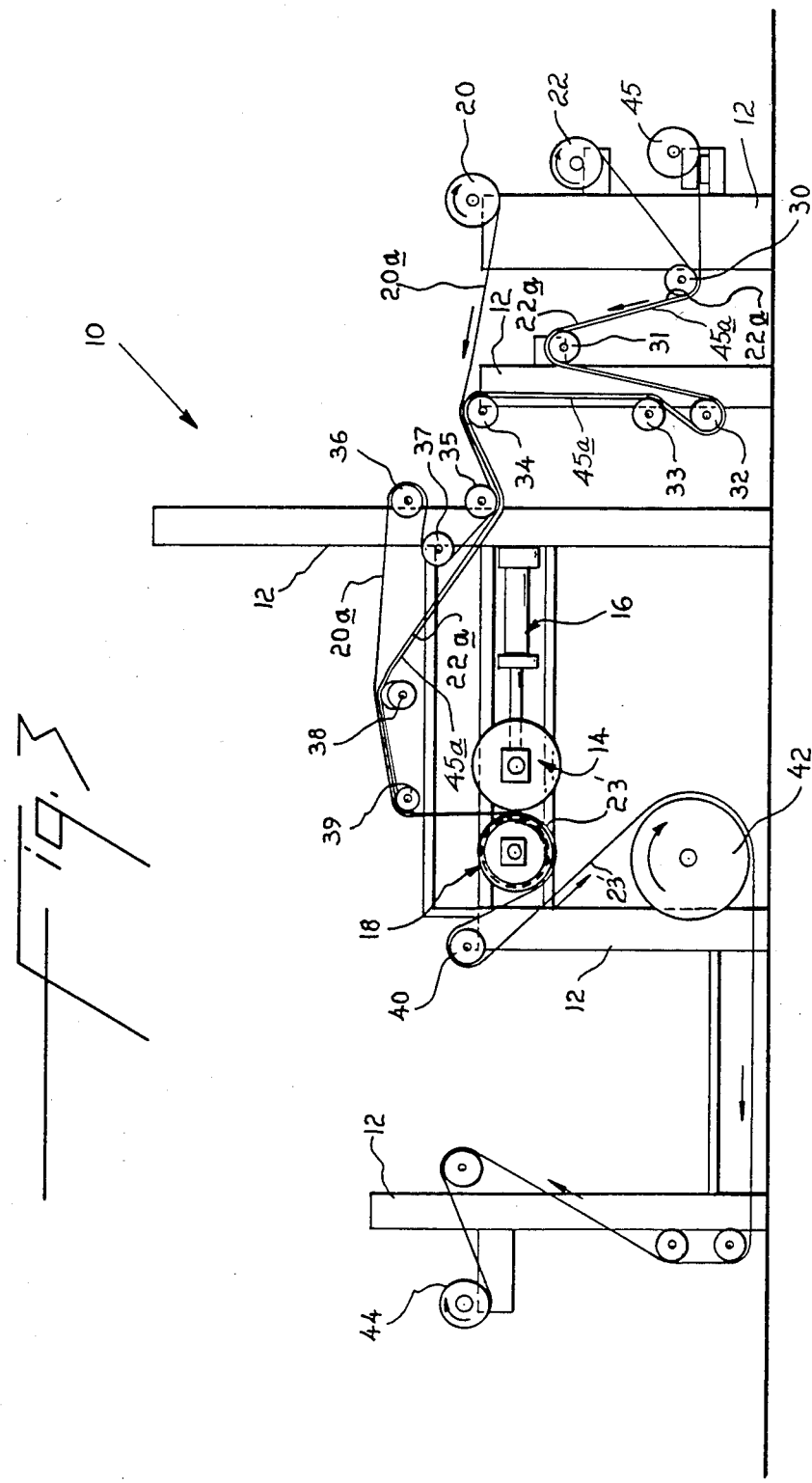
FIG. 3 is a schematic side elevation drawing of an embossing machine utilized in embossing and fusing three layers of film.

In another embodiment of the invention rolls of polyvinyl fluoride pigmented film 20, 22 and transparent film 45 are rotatably mounted to one end of frame 12 (FIG. 3) and the three separate layers 20a, 22a, and 45a are fed to the nip between rolls 14, 18 over a series of rolls designated 30 through 39. The rolls 30–39 control the tension and remove wrinkles from film 20a, 22a, and 45a. After passing through rolls 16, 18, the combined film 23' passes over water cooled rolls 40, 42 where it is cooled before being wound on driven roll 44.

FIG. 4 shows film thickness of the combined film 23' after embossing and fusing of separate films 20a, 22a, and 45a. In operation three sheets of film 20a, 22a, and 45a are passed between the hot embossing roll 14 and the cool backup roll under controlled pressure, temperature and speed. At this point, the pattern is pressed in, and the three sheets are fused together. Any variation in any one variable, and the pattern is lost and the films do not fuse together. A typical run speed for a combination of two 0.002 inch thick films with a 0.0007 inch thick transparent film is from 0.75 to 1.5 yds/minute; the temperature of the embossing roll surface is between 360° and 390° F.; the temperature of the surface of the backup roll can be no higher than 170° F.; and the pressure between the rolls is between 400 and 430 lbs/linear inch of film width. The pressure and feed rate are dependent on the film thickness, and on the depth and type of pattern used. The wind-up mandrel 44 and three unwind mandrel 20, 22, and 45 torque are kept at the minimum necessary to prevent wrinkles.

In a series of runs at these conditions, the 0.0047 inch thick (combination of two 2 mil plus one 0.7 mil thick films) original film thickness is deformed to 7 mil by embossing, from the bottom of the film (which is smooth) to the top of pattern peaks as shown in FIG. 4. This embossed film pattern will survive deep vacuum forming on to shaped panels. The three layers of film are very difficult to separate without tearing.

While illustrated with 2 mil pigmented thick film and 0.7 mil thick transparent film, additional combinations utilizing pigmented films of 1, 3 and 4 mil and transparent films of 0.5 and 1 mil thickness combinations can be used.

We claim:

1. A process for embossing and fusing two layers of polyvinyl fluoride films without adhesive comprising: passing two separate sheets of such film, each being about 0.002 to about 0.004 inch thick between the nip of a heated embossing roll and a backup roll at a speed of about 1 to 1.5 yards per minute, maintaining a pressure between the rolls of from about 400 to 430 lbs per linear inch of film width, maintaining the temperature of the embossing roll in the range of from 360°-390° F. while maintaining the temperature of the backup roll below 170° F. and then cooling and winding said film.

2. A process for embossing and fusing three layers of polyvinyl fluoride films without adhesive comprising: passing three separate sheets of such film, each being about 0.0005 to about 0.004 inch thick between the nip of a heated embossing roll and a backup roll at a speed of about 0.75 to 1.5 yards per minute, maintaining a pressure between the rolls of from about 400 to 430 lbs per linear inch of film width, maintaining the temperature of the embossing roll in the range of from 360°-390° F. while maintaining the temperature of the backup roll below 170° F. and then cooling and winding said film.

* * * * *